Nov. 19, 1968  W. E. WOOLLENWEBER, JR., ET AL  3,411,706
BEARING DURABILITY ENHANCEMENT
DEVICE FOR TURBOCHARGER
Filed Aug. 24, 1966  2 Sheets-Sheet 1

INVENTORS.
WILLIAM E. WOOLLENWEBER, JR.,
KURT A. BEIER and
KARL L. KLEIMENHAGEN
BY Woodard, Weikart, Emhardt & Naughton
Attorneys INVENTORS.
WILLIAM E. WOOLLENWEBER, JR.,
KURT A. BEIER and
KARL L. KLEIMENHAGEN
BY Woodard, Weikart, Emhardt & Naughton
Attorneys

United States Patent Office 3,411,706
Patented Nov. 19, 1968

3,411,706
BEARING DURABILITY ENHANCEMENT DEVICE FOR TURBOCHARGER
William E. Woollenweber, Jr., Columbus, Kurt A. Beier, Morgantown, and Karl L. Kleimenhagen, Indianapolis, Ind., assignors to Wallace-Murray Corporation, New York, N.Y., a corporation of Delaware
Filed Aug. 24, 1966, Ser. No. 574,619
3 Claims. (Cl. 230—116)

ABSTRACT OF THE DISCLOSURE

A bearing arrangement for high speed shafts in which spaced, journal bearings support the shaft on an oil film at high shaft speeds and having additional tilt limiting bearings positioned outwardly of the non-opposed ends of the spaced journal bearings which limit the shaft tilt which occurs at high shaft speed but before the oil film has formed at the journal bearings.

---

This invention relates generally to bearing structures for high speed, rotating shafts and in particular to an auxiliary means for temporarily providing bearing support for a turbocharger shaft prior to the build-up of the oil film which is necessary for proper operation of the conventional turbocharger shaft bearings.

A problem of long standing with regard to high speed rotating shafts, such as turbocharger shafts, involves proper bearing support for the shaft in those initial start-up periods when the shaft is immediately rotated at high speed and before the oil film has accumulated at the conventional turbocharger shaft sleeve bearings. Various attempts at a solution to this problem such as the by-passing of exhaust gases around the turbine during initial engine start-up periods (U.S. Patent 3,102,382), or braking of the turbocharger shaft until oil pressure has increased sufficiently (U.S. Patent 3,179,210), have not been completely successful for some applications.

Quick-start motor-generator sets, where the driving motor is a turbocharged, compression-ignition engine, present an example of a modern application where this problem of inadequate oil for bearing support of the shaft exists in aggravated form. For short periods of time the turbine is required to run without oil at the conventional turbocharger shaft bearings. The whirling or orbiting of the shaft, known to occur at the customary high operating speed of the turbocharger when no bearing oil film is present, drives the shaft intermittently to the extreme of the bearing clearance in the conventional shaft sleeve bearings. This causes metal-to-metal contact between the rotating sleeve and the stationary bearing housing and relatively quickly leads to failure of the conventional turbocharger shaft journal bearings.

The concept of the present invention meets the difficulty referred to above by providing auxiliary rotary bearing elements, preferably ball bearings, outboard of the conventional journal bearings on the shaft. These auxiliary bearings have a clearance with respect to the shaft and have a spacing outboard of the conventional journal bearings on the shaft such that, when there is an absence of lubricating oil film on the conventional bearings, the whirling or orbiting of the shaft axis is limited by these bearings to a magnitude insufficient to permit the conventional sleeve bearings to strike the housing. The auxiliary, outboard bearings make contact with the rotor or shaft before the sleeve bearings engage the housing during the extreme shaft axis tilt or orbiting which occurs prior to the build-up of an oil film on the conventional bearings. Subsequently, during full lubrication condition, the rotor is stabilized and orbiting decreases so that no contact occurs between the auxiliary, outboard bearings and the shaft. The auxiliary bearings thus function only during short, transient intervals and protect the conventional bearings from deleterious, metal-to-metal contact with the bearing housing.

It is an object of the present invention, therefore, to provide an auxiliary bearing structure and arrangement for a high speed shaft which protects and increases the service life of the conventional shaft journal bearings.

It is a further object of the present invention to provide auxiliary bearing structure, outboard of the conventional turbocharger shaft bearings, which attenuate the whipping or orbiting of the turbocharger shaft prior to the appearance of a stabilizing oil film on the conventional bearings.

These and other objects will become apparent as the description proceeds with reference to the accompanying drawings in which.

Figure 1:
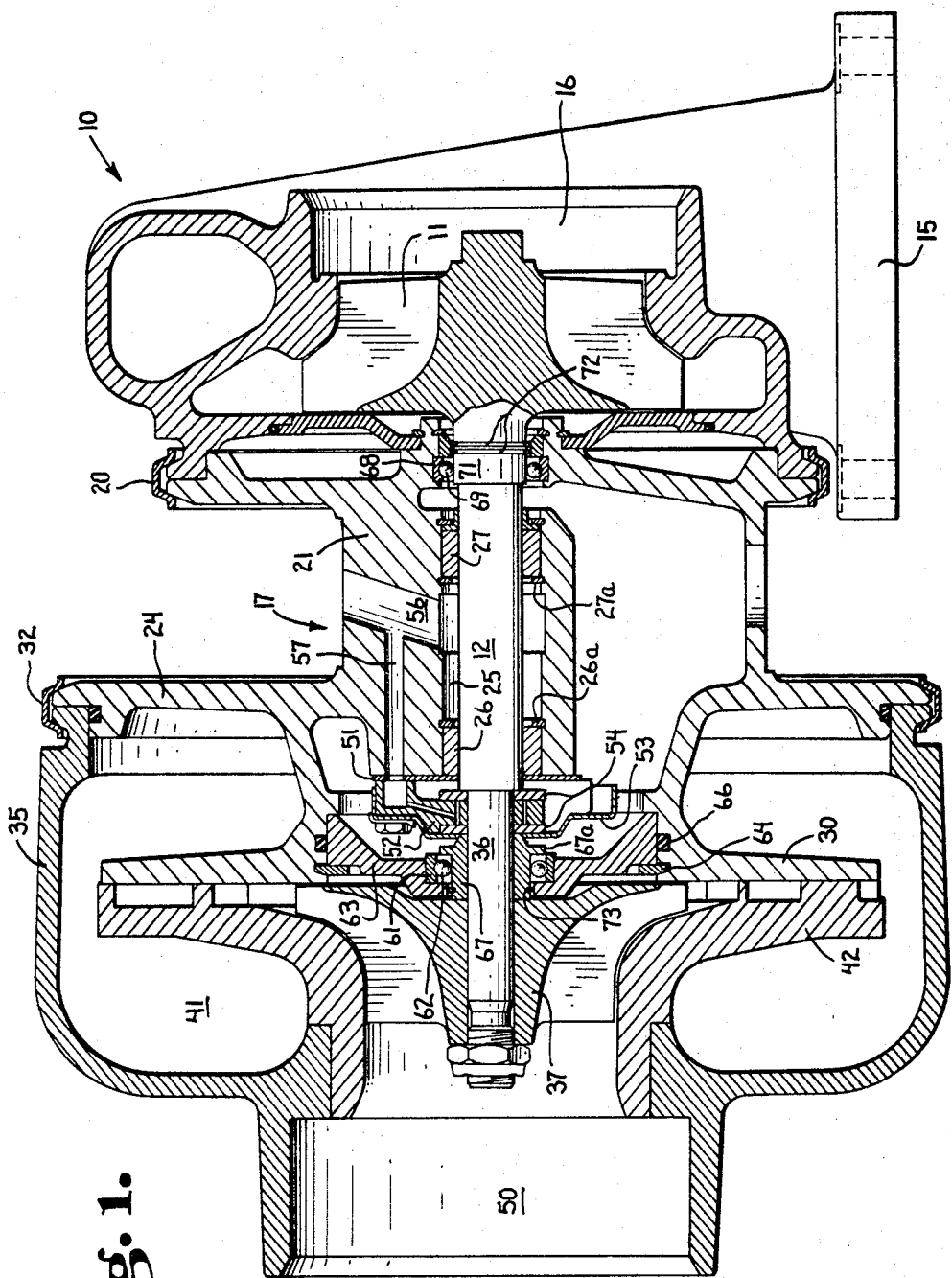
FIG. 1 is a side sectional view of a turbocharger incorporating the bearing structure of the present invention.

Referring initially to FIG. 1, there is illustrated a gas turbine driven supercharger, or turbocharger which includes a tubine housing 10 enclosing a conventional bladed turbine wheel 11 adapted to drive the shaft 12. The turbine housing is provided with a flanged inlet passage 15 which transmits engine exhaust gases to the turbine wheel. The turbine, itself, is of conventional construction and operates in a conventional manner, that is, high pressure gases entering the turbine are expanded through the turbine wheel causing rotation thereof, the spent gases being discharged through the turbine outlet passage 16.

Attached to the turbine housing 10 is an intermediate casting and bearing housing 17, the two castings being retained together in sealed relation by means of a clamp ring 20. The casting 17 is asymmetrical in configuration and includes a central portion 21 and an outwardly flanged portion 24 at one end of the central portion. The central portion 21 is provided with a central aperture 25 through which the shaft 12 extends. Within this aperture, the central portion or housing 21 carries conventional sleeve type bearings 26 and 27 which are spaced from each other in the housing and are retained by retainer rings 26a and 27a. Sufficient clearance exists between the journal bearings 26 and 27 and the shaft 12 and housing 21 to accommodate a lubricating fluid film therebetween and during high speed rotation of the shaft 12, the bearing members 26 and 27 also rotate but at reduced speed compared with that of the shaft 12.

An additional outwardly flanged portion of the casting 17 provides a compressor backplate 30. Attached to the portion 24 of the casting 17, by means of a clamp ring 32, is a compressor cover casting 35. The shaft 12 has an extending portion 36, of reduced diameter, the extending portion having mounted thereon a centrifugal type compressor rotor 37. The compressor casting 35 is formed to provide a generally annular collector area 41 which receives high pressure gases delivered from the compressor.

The casting 35 is further provided with an internal annular flange 42 which cooperates with the flange 30 to provide diffuser passages to the collector area 41, the collector area 41 communicates with a tangentially extending outlet or discharge passage (not visible in FIG. 1), this discharge passage being connected by suitable tubing to the intake manifold of an internal combustion engine served by the turbocharger. The compressor housing casting 35 is flanged to provide an inlet passage 50 which communicates with atmosphere or the air induction system of the engine served by the turbocharger. When the engine upon which the turbocharger is installed is in operation, the exhaust gases will rotate the turbine wheel 11 to drive the compressor wheel 37. Rotation of the compressor wheel will charge the engine with compressed air thereby forcing into the engine cylinders a greater amount of air than could be drawn thereinto by the pumping action of the engine pistons. This charging action combined with increased fuel supply to the engine cylinders produces the increased power characteristic of supercharged engines.

Attached to one end of the housing portion 21 of the casting 17 is a spacer plate 51 and a thrust bearing member 52. Overlying the thrust member 52 is a lubricant deflector plate 53. Cooperating with the stationary deflector member 52 are thrust rings 54. The bearing housing portion 21 of the casting 17 is provided with a primary lubricating oil passage 56 which is adapted to be connected to a source of lubricating and cooling oil under pressure, the source normally being the lubricating system of the engine served by the turbocharger. A branch passage 57 provides lubricating oil to the thrust bearing 52 and the oil thus supplied circulates through the thrust bearing and the fluid introduced into the central opening 25 through which the shaft 12 extends provides a stabilizing lubricating fluid film around the sleeve bearings 26 and 27 so that an oil film exists between the exterior surface of the bearings and the housing 21 and between the interior surface of the bearings and the shaft 12. The circulation of lubricating fluid through the thrust bearing is described in detail in U.S. Patent 3,077,296, assigned to the assignee of the present invention, and the rotating characteristic of the sleeve bearings 26 and 27 is described in detail in U.S. Patent 3,096,126, assigned to the assignee of the present invention. The structure so far described is, in general, shown in the aforesaid U.S. patents and provides the environment for the bearing arrangement of the present invention.

As previously mentioned if the shaft 12 rotates at high speed, as at engine start-up, for example, prior to the build up of the stabilizing lubricating fluid film around the sleeve bearings 26 and 27, the shaft tends to tilt or orbit during this high speed rotation and if such shaft whirling or tilting is unattenuated it tends to place the outer surface of the bearing sleeves 26 and 27 into metal-to-metal engagement with the adjacent wall of the housing 21. The means for limiting or attenuating this orbiting of the shaft axis takes the form of tilt-limiting bearing structures disposed along the shaft 12 outboard of the sleeve bearings 26 and 27. As shown in FIG. 1, these outboard bearing structures take the form of, on the left-hand end of shaft 12, an outer race member 61 accommodating ball bearings 62. The outer race 61 is rigidly held in a stationary member 63 clamped to the adjacent casting at the base of the flange 30. The clamp ring 64 and the sealing ring 66 retain the member 63 in place and serve to seal the interior of the compressor against the entry of lubricating fluid from the bearing area. The ball bearings 62 cooperate with an oil flinger sleeve 67, the sleeve 67 providing both an area of engagement for the ball bearings 62 and its flanged portion 67a also serving to fling oil or other lubricating fluid outwardly to prevent its migration into the compressor area.

At the turbine end of the shaft, an outer bearing race member 68 is rigidly fittted within the hub portion of the housing and accommodates ball bearings 69 which cooperate with the somewhat enlarged portion 71 of the shaft 12. Dual sealing rings 72, and the single sealing ring 73 (at the compressor end of the shaft) serve to seal the intermediate bearing segment of the shaft from its turbine and compressor ends, respectively.

The clearance of the two outboard ball bearing structures with respect to the shaft is sufficient to prevent loading engagement (that is, an engagement which actually transfers substantial, radial bearing load from the shaft to the bearing structure) with the shaft when the stabilizing lubricating fluid film is present on the sleeve bearings 26 and 27. The bearing clearance at the outboard ball bearings, however, does provide for loading engagement of the ball bearings and the shaft should the shaft axis tilt or orbit substantially as occurs when the shaft is rotating at high speed prior to the build up of the lubricating fluid film about the sleeve bearings 26 and 27. Since the ball bearing structures are outboard of the sleeve bearings, any displacement of the shaft caused by its tilting or orbiting has a greater magnitude at the outboard bearings than at the journal bearings 26 and 27 so that, under these conditions of extreme axis tilt, the shaft (or the sleeve 67 carried thereby) will engage the ball bearings to limit the shaft tilt before the outer surfaces of the sleeve bearings 26 and 27 can strike the housing wall. The outboard bearings thus function as bearings only during the transient intervals of extreme or substantial tilt of the shaft axis and function to prevent metal-to-metal engagement of the conventional sleeve bearings with the adjacent sleeve bearing housing.

Figures 2, 3, 4, 5:
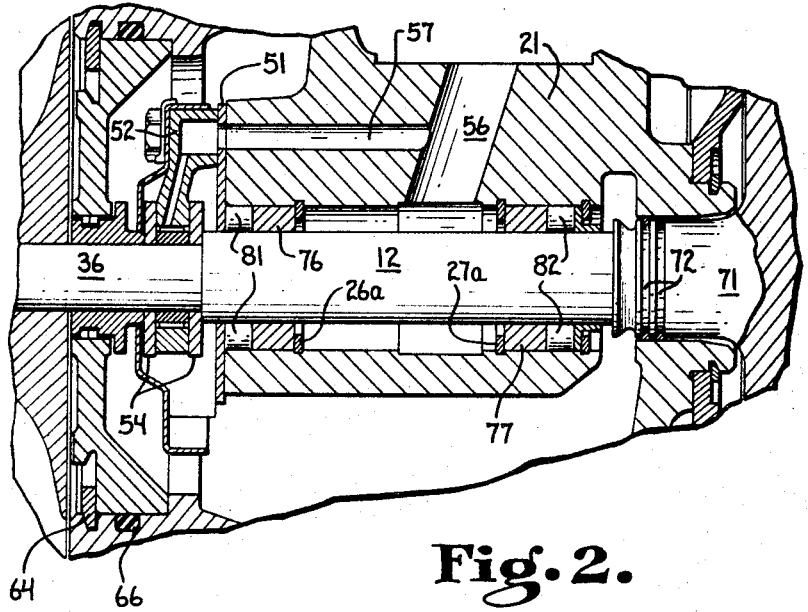
FIG. 2 is an enlarged fragmentary, side sectional view of a turbocharger incorporating a modified form of the bearing structure of the present invention.
FIG. 3 is a side sectional view of a component of the bearing structure shown in FIG. 2.
FIG. 4 is an end view of the bearing component shown in FIG. 3.
FIG. 5 is a fragmentary sectional view, similar to FIG. 2, but showing a further modified form of the bearing structure of the present invention.

FIG. 2 illustrates a modified form of the bearing structure of the present invention and differs from that previously described primarily in that the outboard, auxiliary bearings are roller bearings, rather than ball bearings structures. In FIG. 2 parts which are identical to those shown in FIG. 1 are given the same reference numerals as in FIG. 1. The conventional sleeve bearings for the turbocharger shaft 12, identified at 76 and 77 in FIG. 2 are shorter in length than the comparable sleeve bearings 26 and 27 of FIG. 1. As will be evident from FIGS. 3 and 4, the sleeve bearing 76 (bearing 77 being identical to bearing 76) is provided with grooves 78 in one of its ends which accommodate roller bearing members 81 (FIG. 2). As shown in FIG. 4, the end face of the sleeve bearing member 76 is also provided with radial lubricating fluid circulating grooves 79 and the inner surface of the sleeve bearing as provided with lubricating fluid circulating grooves 83, these merely serving to facilitate the initiation and maintenance of the lubricating fluid film by circulation of oil about the sleeve bearing. The grooves in the sleeve bearing 77, corresponding to groove 78, accommodate roller bearing members 82.

The function and operation of the roller bearing members 81 and 82 of FIG. 2 are similar to the ball bearing structures of FIG. 1. Since the roller bearing members are located outboard of the sleeve type bearings 76 and 77, displacement of the shaft axis caused by orbiting in the absence of the lubricating fluid film has a greater magnitude at the roller bearing members than at the sleeve bearings 76 and 77. As in the case of the ball bearing structures of FIG. 1, the clearance at the roller bearings is such as to provide loading engagement of the roller bearings 81 and 82 with the shaft only when the shaft axis is subject to substantial tilting as occurs in the absence of the stabilizing fluid film about the sleeve bearings 76 and 77. The presence of the roller bearing elements 81 and 82 prevents the sleeve bearings from striking the housing during the transient periods when no lubricating fluid film encompasses the sleeve bearings.

Referring to FIG. 5 a further modified form of the bearing structure of the present invention will be described. It differs from the arrangement described with reference to FIGS. 2, 3 and 4 primarily in that ball bearings are utilized at the outer ends of foreshortened sleeve bearings, rather than the groove embraced roller bearing members 81 of FIG. 2. In FIG. 5 parts which are identical to those shown in FIGS. 2, 3 and 4 are given the same reference numerals as in those figures. The conventional sleeve bearings for the turbocharger shaft 12, identified at 86 and 87 in FIG. 5, are shorter in length than the comparable bearings 76 and 77 of FIG. 2 because of the elimination of the grooves 78 of FIG. 3 and the sleeve bearing portion into which they extend. These foreshortened sleeve bearings 86 and 87 encircle the shaft 12 and the space adjacent their outer ends is occupied by a series of ball bearing members 88.

The function and operation of the ball bearing members 88 are similar to the roller bearing members of FIG. 2. Since the ball bearing members 88 are located outboard of the sleeve type bearings 86 and 87, displacement of the shaft axis caused by orbiting in the absence of the lubricating fluid film has a greater magnitude at the ball bearing members 88 than at the sleeve bearings 86 and 87. The clearance at the ball bearings is such as to provide loading engagement of the ball bearings 88 with the shaft only when the shaft axis is subject to substantial tilting as occurs in the absence of the stabilizing fluid film about the sleeve bearings 86 and 87. The ball bearings 88 prevent the sleeve bearings from striking the housing during the transient periods when no lubricating fluid film coats the sleeve bearings.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

We claim:
1. In combination, a bearing structure and a high speed rotating shaft, said bearing structure comprising a journal bearing housing, spaced journal bearings within said housing and encircling said shaft, the clearance between said shaft, journal bearings and housing being sufficient to accommodate a lubricating fluid film therebetween, and shaft axis tilt limiting bearings disposed along said shaft outboard of said journal bearings whereby any displacement of the shaft axis caused by tilting thereof has a greater magnitude at said limiting bearings than at said journal bearings, said limiting bearings having a clearance with respect to said shaft which is sufficient to prevent loading engagement with the shaft when a stabilizing lubricating fluid film is present on said journal bearings and to provide loading engagement of the limiting bearings and said shaft to prevent said journal bearings from striking said housing as the rotating shaft axis tilts in the absence of said stabilizing film on said journal bearings.

2. The combination claimed in claim 1 in which the shaft is the common shaft extending between the turbine wheel and compressor rotor of a turbocharger, and said limiting bearings take the form of stationary outer ball-bearing races encircling said shaft with ball-bearings disposed between the shaft and said outer races.

3. The combination claimed in claim 1 in which the shaft is the common shaft extending between the turbine wheel and compressor rotor of a turbocharger, and each of said limiting bearings takes the form of a series of roller elements disposed around said shaft and between the shaft and said housing.

References Cited

UNITED STATES PATENTS

| | | |
|---|---|---|
| 2,165,448 | 7/1939 | Browne. |
| 3,058,787 | 10/1962 | Bernson _____ 308—121 |
| 3,305,280 | 2/1967 | Peterson _____ 308—35 |

FOREIGN PATENTS

| | | |
|---|---|---|
| 254,064 | 11/1960 | Australia. |
| 464,649 | 8/1928 | Germany. |

MARTIN P. SCHWADRON, *Primary Examiner.*

FRANK SUSKO, *Assistant Examiner.*